United States Patent
March Nomen et al.

(10) Patent No.: US 10,125,744 B2
(45) Date of Patent: Nov. 13, 2018

(54) LIGHTNING PROTECTION SYSTEM FOR WIND TURBINE BLADES WITH CONDUCTING STRUCTURAL COMPONENTS

(71) Applicant: GAMESA INNOVATION & TECHNOLOGY, S. L., Sarriguren (ES)

(72) Inventors: Victor March Nomen, Sarriguren (ES); Francisco Javier Bandres Gomez, Zamudio (ES); Javier Iriarte Eleta, Zamudio (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 368 days.

(21) Appl. No.: 15/137,159

(22) Filed: Apr. 25, 2016

(65) Prior Publication Data

US 2016/0327028 A1    Nov. 10, 2016

(30) Foreign Application Priority Data

May 8, 2015   (ES) .................................. 201500337

(51) Int. Cl.
*F03D 80/30*        (2016.01)
*F03D 13/10*        (2016.01)

(52) U.S. Cl.
CPC .............. *F03D 80/30* (2016.05); *F03D 13/10* (2016.05); *Y02E 10/721* (2013.01)

(58) Field of Classification Search
CPC .......... F03D 80/30; F03D 13/10; Y02E 10/721
See application file for complete search history.

(56) References Cited

U.S. PATENT DOCUMENTS

| | | | |
|---|---|---|---|
| 7,651,320 B2* | 1/2010 | Hansen | H02G 13/00 416/1 |
| 7,883,321 B2* | 2/2011 | Bertelsen | F03D 80/30 416/146 R |
| 8,133,031 B2* | 3/2012 | Arinaga | H02G 13/00 29/889.71 |
| 8,182,227 B2* | 5/2012 | Jacobsen | F03D 1/0675 416/146 R |

(Continued)

FOREIGN PATENT DOCUMENTS

| | | |
|---|---|---|
| EP | 2 458 207 A2 | 5/2012 |
| ES | 2 396 839 A1 | 2/2013 |
| WO | 2006/051147 A1 | 5/2006 |

*Primary Examiner* — Dwayne J White
*Assistant Examiner* — Adam W Brown
(74) *Attorney, Agent, or Firm* — Ladas & Parry LLP

(57) ABSTRACT

The invention provides a lightning protection system for a wind turbine blade (10), whose structure comprises two structural shells (11, 13) with two caps (19, 21) formed by carbon fiber laminates and two spars (15, 17). In addition to a first subsystem formed by one or more lightning receptors connected to one or two conductor cables the lightning protection system comprises a second subsystem formed by lateral lightning receptors (30, 31) arranged at the leading and trailing edges of the wind turbine blade (10) in at least two cross sections (22, 23) of it connected with the caps (19, 21) and connecting means between the two subsystems for equipotentializing the lightning protection system.

9 Claims, 3 Drawing Sheets

(56) References Cited

U.S. PATENT DOCUMENTS

| | | | |
|---|---|---|---|
| 8,517,681 B2* | 8/2013 | Naka | F03D 80/30 |
| | | | 416/1 |
| 9,422,914 B2* | 8/2016 | Appleton | F03D 1/0675 |
| 9,702,338 B2* | 7/2017 | Richers | F03D 1/0675 |
| 2009/0246025 A1* | 10/2009 | Lewke | F03D 1/0675 |
| | | | 416/146 R |
| 2015/0098823 A1* | 4/2015 | Iriarte Eleta | F03D 11/0025 |
| | | | 416/146 R |
| 2015/0292487 A1* | 10/2015 | Ohlerich | H02G 13/80 |
| | | | 416/146 R |
| 2016/0138569 A1* | 5/2016 | Caruso | F03D 1/0675 |
| | | | 416/241 R |
| 2016/0177926 A1* | 6/2016 | Akhtar | F03D 80/30 |
| | | | 416/229 A |

* cited by examiner

LIGHTNING PROTECTION SYSTEM FOR WIND TURBINE BLADES WITH CONDUCTING STRUCTURAL COMPONENTS

FIELD OF THE INVENTION

The invention relates to a lightning protection system for wind turbine blades with conducting structural components and to an installing method of such system on wind turbine blades with structural shells.

BACKGROUND

Because of the height reached by wind turbines and their location on elevated areas, they have a high risk of receiving lightning strikes particularly at its blades. Therefore the blades must have a lightning protection system and any additional system installed in them containing conductive elements (metal parts, sensors, beacon systems, etc.) must be protected against direct lightning strikes and indirect effects due to the electromagnetic field induced by them.

The primary components of lightning protection system for wind turbine blades are a series of metal receptors mounted on the surface of the blade and a down conductor to drive the lightning from the receptors to the blade root. The evolution in wind turbines development together with the growth of the power provided by them has led to new generations of wind turbines having increasing dimensions both in tower height and rotor diameter. Blade lengthening involves an increase in rigidity. The use of more carbon fiber laminates in the manufacturing of blades is a conventional way to achieve this rigidity. However, carbon fiber laminates are conductors and must therefore be connected in parallel with the down conductor of the lightning protection system to prevent internal arcing between the down conductor and the laminates as well as direct lightning strikes on the carbon laminates.

WO 2006/051147 A1 describes a lightning protection system comprising means for equipotentializing the carbon fiber laminates with the down conductor including auxiliary cables to connect directly the down conductor with the carbon fiber laminates. These auxiliary cables are connected using a joint screwed to a metal plate in direct contact with the layers of carbon fiber. The electrical connection can be improved by adding conductive resins to the joint area.

ES 2 396 839 describes a lightning protection system for a wind turbine blade formed by various connections arranged on the carbon fiber laminates of the blade equipotentializing the surface of beam flanges through derivations of a primary cable by means of auxiliary cables and a high inductance device mounted on the connection between the carbon fibre laminates and the primary cable to reduce the passage of current across the carbon laminates and favour the conduction through the primary cable.

While the installation of the abovementioned lightning protection systems in wind turbine blades of a conventional structure does not pose problems it does not happen the same in the case of wind turbine blades with structural shells.

The present invention is directed to solving that problem.

SUMMARY OF THE INVENTION

In a first aspect, the invention provides a lightning protection system for a wind turbine blade, whose structure comprises two structural shells that include two caps formed by carbon fiber laminates and two spars, comprising a first subsystem formed by one or more receptors connected to one or two conductive cables disposed within the wind turbine blade to drive lightning to ground, a second subsystem formed by lateral lightning receptors arranged in the leading and trailing edges in at least two cross sections of the wind turbine blade connected with the caps and connecting means between the two subsystems for equipotentializing the lightning protection system. The lateral lightning receptors are formed by one or more internal conducting blocks and external connectors configured to electrically connect them together.

Advantageously the terminals of the second subsystem in the caps of the wind turbine blade are metal plates.

Advantageously said external connectors are dimensioned for making contact with the internal conducting blocks.

In a second aspect, the invention provides an installation method of the above mentioned lightning protection system in a wind turbine blade whose structure comprises two structural shells that include two caps formed by carbon fiber laminates and two spars and whose manufacturing method comprises a first stage of manufacturing said caps, a second stage of manufacturing the structural shells with said caps embedded in them; a third stage of joining the spars to the lower shell and a fourth stage of joining the upper shell to the lower shell and the spars. The installation method comprises the following steps: a) including conductor terminals in the caps in the first stage; b) mounting on each of said cross sections the internal conducting blocks of the lateral lightning receptors during the second stage and after finishing the mounting connecting them to the caps by means of auxiliary cables; c) connecting the internal components of the two subsystems in the third stage; d) connecting between them the internal conducting blocks of the lateral lightning receptors in the fourth stage.

Other features and advantages of the present invention will be understood from the following detailed description in relation with the enclosed figures.

BRIEF DESCRIPTION OF THE FIGS.

DETAILED DESCRIPTION OF THE INVENTION

Figure 1A:
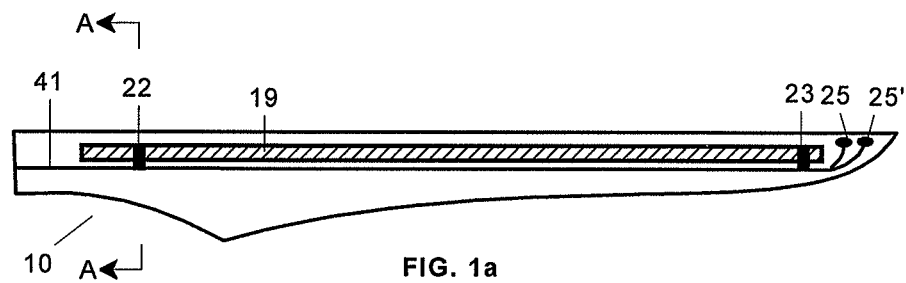
FIGS. 1a-1b and 2a-2b are schematic plan and cross sectional by plane A-A views of a lightning protection system for a wind turbine blade according to two embodiments of the invention.

The lightning protection system of the invention is addressed to a wind turbine blade 10 whose structure comprises an upper structural shell 11 and a lower structural shell 13 incorporating, respectively, caps 19, 21 made of carbon fiber laminates and, especially, a wind turbine blade 10 manufactured by an infusion process by which the integration of caps 19, 21 in the structural shells 11, 13 is performed.

Figure 1B:
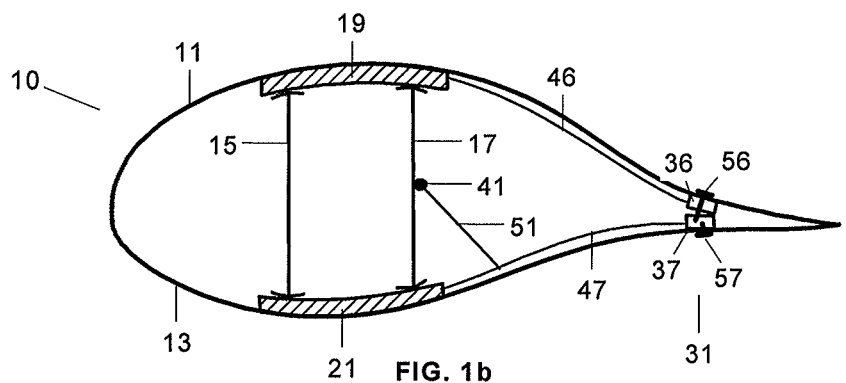
Figure 2A:
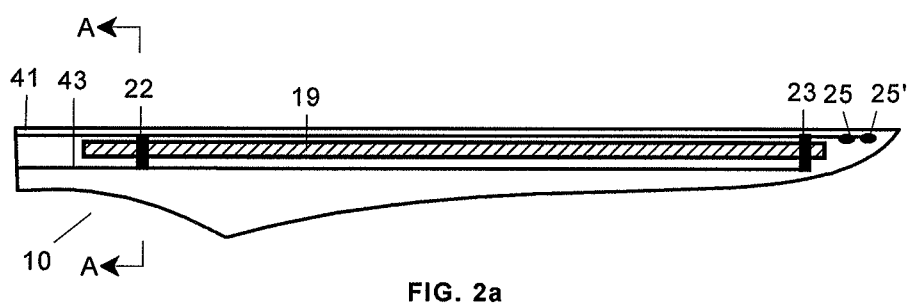
Figure 2B:
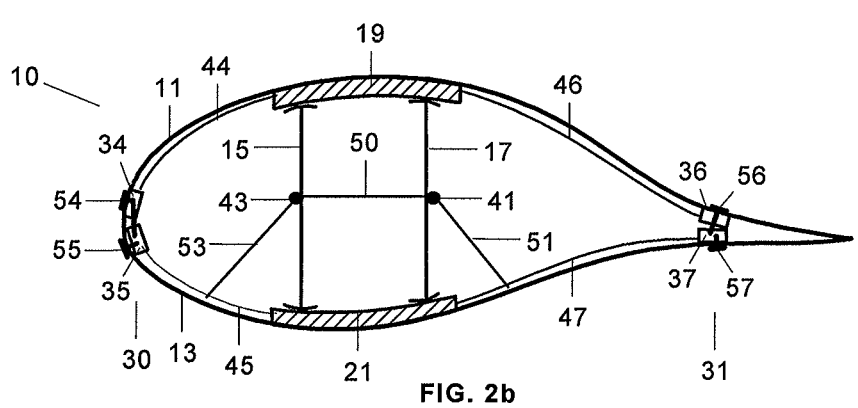
Figure 3A:
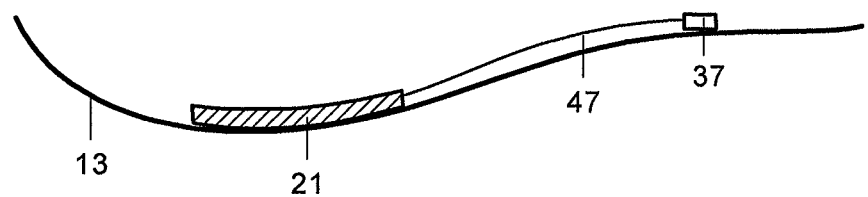
FIGS. 3a-3b, 4 and 5 are schematic cross sectional views by plane A-A illustrating the fundamental steps of the installation method of a lightning protection system of a wind turbine blade according to an embodiment of the invention.
Figure 3B:
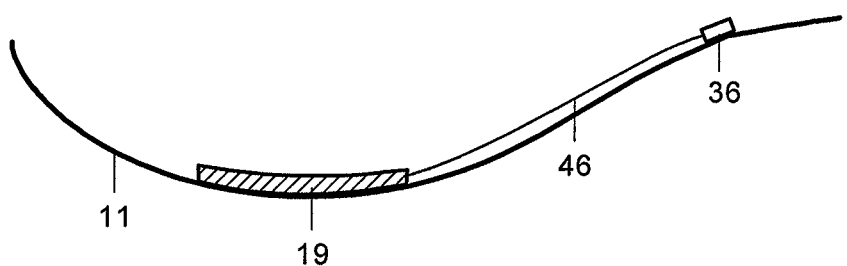

The lightning protection system comprises a first subsystem, well known in the art, comprising one or more lightning receptors 25, 25' connected to a first conductor cable 41 (see FIGS. 1a, 1b) or to a first and a second conductor cable 41, 43 (see FIGS. 2a, 2b) arranged inside of the wind turbine blade 10 for driving them to ground.

The lightning protection system comprises a second subsystem disposed in at least two cross sections 22, 23 of the wind turbine blade 10 that includes (depending on the number of conductor cables of the first subsystem) one or two lateral lightning receptors 30, 31, first and thirst auxiliary cables 46, 47; 44, 45 to connect them to the caps 19, 21, establishing thus a lightning conducting circuit through the carbon fiber laminates of the caps 19, 21.

The lightning protection system has connection means of both subsystems for equipotentializing them including (depending on the number of conductor cables of the first subsystem) a second and, if applicable, a fourth auxiliary cable 51, 53 connected, by one side, to the conductor cables 41, 43 and, by the other side, to a first and, if applicable, a third auxiliary cable 47, 45 as well as an equipotential bar 50 connecting, where appropriate, the conductor cables 41, 43.

The lateral lightning receptors 30, 31 installed in, respectively, the leading edge and the trailing edge of the wind turbine blade 10 in cross sections 22, 23 comprise, respectively, in each of them first and second internal conducting blocks 36, 37; 34, 35 and first and second external connectors 56, 57; 54, 55 configured to allow their electrical connection.

The installation method of the lightning protection system in a wind turbine blade 10 comprises the following steps:

Step 1: Insert conductor terminals such as cables or plates in the caps 19, 21 during their manufacturing process as carbon fiber laminates. The conductor terminals are inserted in the stage of laying-up prepreg plies before the curing stage.

Step 2 (see FIGS. 3a-3b and 6a-6b): Connect the first internal conducting blocks 36, 37 (embodiment with a first conductor cable 41) or the first and second internal conducting blocks 36, 37; 34, 35 (embodiment with a first and a second conductor cable 41, 43) with the caps 19, 21 by, respectively, first auxiliary cables 46, 47 or first and third auxiliary cables 46, 47; 44, 45, being the shells 11, 21 in their moulds with the caps 19, 21 embedded in them after completing the curing process.

Figure 4:
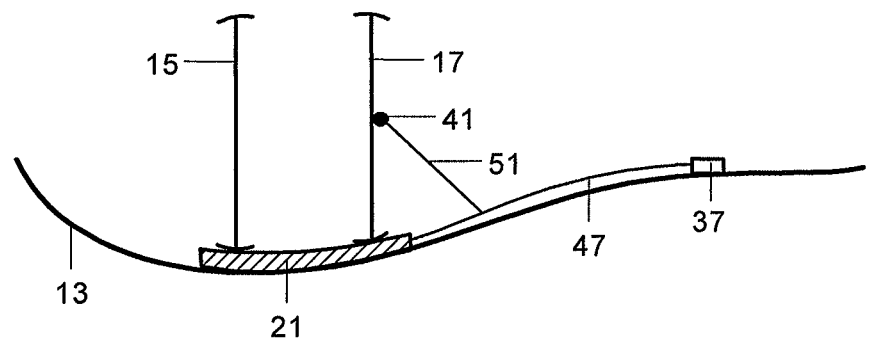
Figure 7:
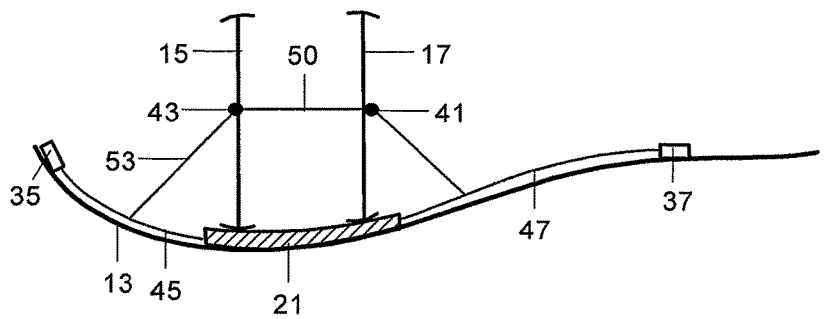

Step 3 (see FIGS. 4 and 7): After co-bonding the spars 15, 17 to the lower shell 13 connect the first conductor cable 41 or the first and second conductor cables 41, 43 attached, respectively, to the spar 17 or to the spars 15, 17, with, respectively, the first auxiliary cable 47 or with the first and third auxiliary cables 47, 45 and, in the second case, connect the equipotential bar 50 to the first and second conductor cables 41, 43.

Figure 5:
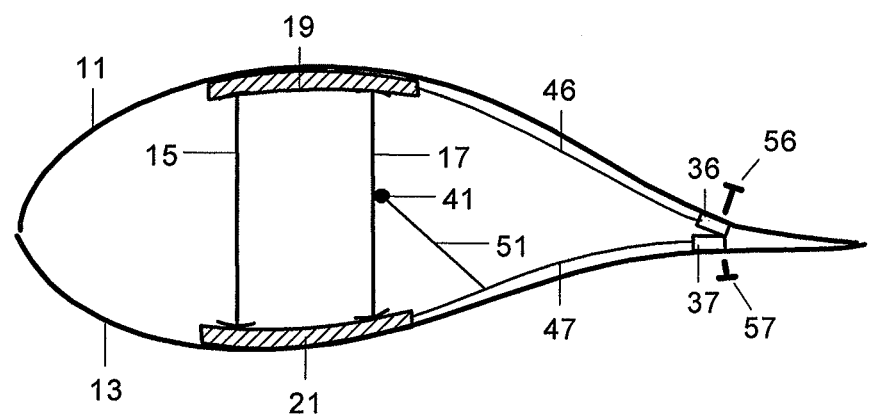
Figure 6A:
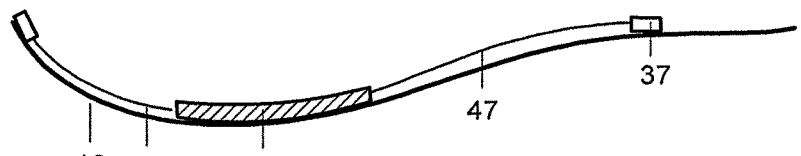
FIGS. 6a-6b, 7 and 8 are schematic cross-sectional views by plane A-A illustrating the fundamental steps of the installation method of a lightning protection system of a wind turbine blade according to another embodiment of the invention.
Figure 6B:
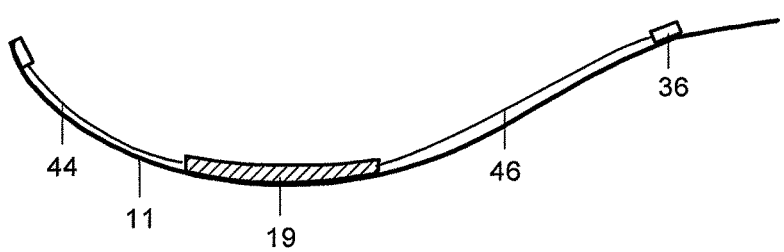
Figure 8:
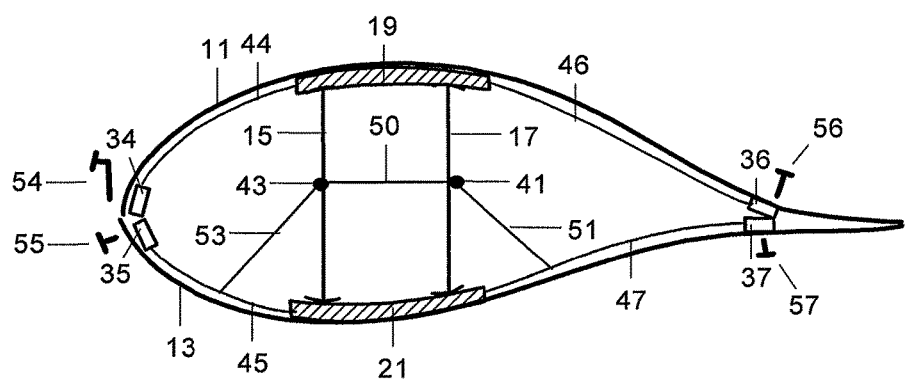

Step 4: (see FIGS. 5 and 8) After arranging the upper shell 11 on the lower shell 13 and closing the moulds proceed to interconnect the first internal conducting blocks 36, 37 (embodiment with a first conductor cable 41) or the first and second internal conducting blocks 36, 37; 34, 35 (embodiment with a first and a second conductor cable 41 and 43) through respectively the first external connectors 56, 57 or the first and second external connectors 56, 57; 54, 55 being finally the wind turbine blade 10 in the situation shown in FIGS. 1b and 2b respectively. Note that the first external connectors 56, 57 are in contact with the first and second internal conducting blocks 36, 37; 34, 35 of each lateral lightning receptor 31, 30.

Although the present invention has been described in connection with various embodiments, it will be appreciated from the specification that various combinations of elements, variations or improvements therein may be made, and are within the scope of the invention as defined by the appended claims.

The invention claimed is:

1. Lightning protection system of a wind turbine blade (10), whose structure comprises two structural shells (11, 13) including two caps (19, 21) formed by carbon fiber laminates and two spars (15, 17), comprising:
   a first subsystem comprising one or more lightning receptors (25, 25') connected to a first conductor cable (41) disposed inside of the wind turbine blade (10) for driving lightning to ground;
   a second subsystem comprising connecting means between the caps (19, 21) and the first conductor cable (41) allowing equipotentializing the lightning protection system in at least two cross sections (22, 23) of the wind turbine blade (10);
   characterized in that:
   the second subsystem also comprises in each of said cross sections (22, 23) a first lateral lightning receptor (31) arranged on one edge of said cross sections (22, 23) including first internal conducting blocks (36, 37) in the structural shells (11, 13) and first external connectors (56, 57) configured so that they can interconnect electrically the first internal conducting blocks (36, 37);
   the first internal conducting blocks (36, 37) are connected to the caps (19, 21) by first auxiliary cables (46, 47);
   the first conductor cable (41) is connected to one of the first auxiliary cables (46, 47) via a second auxiliary cable (53).

2. Lightning protection system according to claim 1, wherein the terminals of the caps (19, 21) to which said first auxiliary cables (46, 47) are connected are metal plates.

3. Lightning protection system according to claim 1, wherein the first lightning conductor cable (41) is attached to one of the spars (15, 17) of the wind turbine blade (10).

4. Lightning protection system according to claim 1, wherein one of the first external connectors (56, 57) is dimensioned to contact with the first internal conducting blocks (36, 37).

5. Lightning protection system according to claim 1, wherein:
   the first subsystem further comprises a second conductor cable (43) arranged inside of the wind turbine blade (10) for driving lightning to ground;
   the second subsystem further comprises in each of said cross sections (22, 23) a second lateral lightning receptor (30) arranged at the edge of said cross sections opposite to the edge of the first lateral lightning receptor (31) that includes second internal conducting blocks (34, 35) in the structural shells (11, 13) and second external connectors (54; 55) configured so that they allow to interconnect electrically the second internal conducting blocks (34, 35);
   the second internal conducting blocks (34, 35) are connected to the caps (19, 21) by third auxiliary cables (44, 45);
   the second conductor cable (43) is connected to one of said third auxiliary cables (44, 45) by a fourth auxiliary cable (53);
   the second subsystem further comprises an equipotential bar (50) connected to the first and second conductor cables (41, 43).

6. System according to claim 5, wherein the terminals of caps (19, 21) to which said third auxiliary cables (44, 45) are connected are metal plates.

7. System according to claim 5, wherein the second conductor cable (43) is attached to the one of the spars (15, 17) of the wind turbine blade (10) to which is not attached the first lightning conductor cable (41).

8. Method of installing a lightning protection system according to claim 1 in a wind turbine blade (10) whose structure comprises two structural shells (11, 13) including two caps (19, 21) formed by carbon fiber laminates and two spars (15, 17);

the manufacturing process of the wind turbine blade (10) comprising a first stage of manufacturing said caps (19, 21), a second stage of manufacturing the structural shells (11, 13) with said caps (19, 21) embedded therein; a third stage of joining the spars (15, 17) to the lower structural shell (13) and a fourth stage of joining the two structural shells (11, 13);

characterized by comprising the following steps:
  a) including conducting terminals in the caps (19, 21) in the first stage;
  b) mounting in each of said cross sections (22, 23) the first internal conducting blocks (36, 37) of the first lateral lightning receptor (31) during the second stage and after it connect them to the caps (19, 21) by the first auxiliary cables (46, 47);
  c) attaching the first conductor cable (41) to the spar (17) closest to the first lateral lightning receptor (31) and connect it to the first auxiliary cable (47) through the second auxiliary cable (51) in the third stage;
  d) interconnect the first internal conducting blocks (36, 37) by means of the first external connectors (56, 57) in the fourth stage.

9. Method of installing a lightning protection system according to claim 5 in a wind turbine blade (10) whose structure comprises two structural shells (11, 13) including two caps (19, 21) formed by carbon fiber laminates and two spars (15, 17);

the manufacturing process of the wind turbine blade (10) comprising a first stage of manufacturing said caps (19, 21), a second stage of manufacturing the structural shells (11, 13) with said caps embedded therein, a third step of joining the spars (15, 17) to the lower shell (13) and a fourth step of joining the two structural shells (11, 13);

characterized by comprising the following steps:
  a) including conductive terminals in the caps (19, 21) in the first stage;
  b) mounting in each of said cross sections (22, 23) the first and second internal conducting blocks (34, 35; 36, 37) of the first and second lateral lightning receptors (30, 31) during the second stage and after it connecting them to the caps (19, 21) through the first auxiliary cables (46, 47) and the third auxiliary cables (44, 45);
  c) attach the first and second conductor cables (41, 43) to the spars (15, 17), mounting the equipotential bar (20) between them and connect them, respectively, to the first and third auxiliary cable (47, 45) by the second and fourth auxiliary cable (51, 53) in the third stage;
  d) interconnect the first and second internal conducting blocks (36, 37; 34, 35) through the first and second external connectors (56, 57; 54, 55) in the fourth stage.

\* \* \* \* \*